United States Patent
Kaji et al.

(10) Patent No.: US 9,685,799 B2
(45) Date of Patent: Jun. 20, 2017

(54) STORAGE BATTERY CONTROL DEVICE, STORAGE BATTERY CONTROL METHOD, AND STORAGE BATTERY CONTROL SYSTEM

(71) Applicant: PANASONIC INTELLECTUAL PROPERTY MANAGEMENT CO., LTD., Osaka (JP)

(72) Inventors: Mitsuru Kaji, Osaka (JP); Tzen Woo Tham, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 14/777,631

(22) PCT Filed: Mar. 14, 2014

(86) PCT No.: PCT/JP2014/001463
§ 371 (c)(1),
(2) Date: Sep. 16, 2015

(87) PCT Pub. No.: WO2015/136575
PCT Pub. Date: Sep. 17, 2015

(65) Prior Publication Data
US 2016/0352114 A1     Dec. 1, 2016

(51) Int. Cl.
*H02J 7/00*       (2006.01)
*H02J 3/24*       (2006.01)
*H02J 3/32*       (2006.01)

(52) U.S. Cl.
CPC ............. *H02J 7/0029* (2013.01); *H02J 3/24* (2013.01); *H02J 3/32* (2013.01); *H02J 7/007* (2013.01);
(Continued)

(58) Field of Classification Search
CPC ......... H02J 2007/0037; H02J 2007/004; H02J 3/24; H02J 3/32; H02J 7/0029; H02J 7/007
(Continued)

(56) References Cited

U.S. PATENT DOCUMENTS 7,925,597 B2    4/2011  Takano et al.
2009/0164393 A1*  6/2009  Takano .................. G06Q 50/06
                                                            705/412
(Continued)

FOREIGN PATENT DOCUMENTS

JP         4694614         8/2007
JP         4155674         7/2008
(Continued)

OTHER PUBLICATIONS

Japan Office Action, mailed Mar. 22, 2016, for the corresponding Japanese Patent Application No. 2015-530217.
(Continued)

Primary Examiner — Nathaniel Pelton
(74) Attorney, Agent, or Firm — Greenblum & Bernstein, P.L.C.

(57) ABSTRACT

A storage battery controller includes a charging/discharging rate setter which sets a rate at which the battery is charged/discharged to approximate the power system frequency to rated frequency; and a charge and discharge controller which controls charge and discharge of the battery, in which the gain adjuster: when the measured charge level is lower than a lower limit of a normal range and the obtained power system frequency is within a first non-sensitive zone ranging from a first frequency lower than the rated frequency to the rated frequency, decreases the charging rate to a predetermined percentage of the charging rate; and when the measured frequency is higher than an upper limit of the normal range and the obtained power system frequency is within a second non-sensitive zone ranging from a second frequency
(Continued)

higher than the rated frequency to the rated frequency, adjusts the discharging rate to decrease the discharging rate.

16 Claims, 11 Drawing Sheets

(52) U.S. Cl.
CPC . *H02J 2007/004* (2013.01); *H02J 2007/0037* (2013.01)

(58) Field of Classification Search
USPC .......................................... 320/134
See application file for complete search history.

(56) References Cited

U.S. PATENT DOCUMENTS

2015/0001939 A1* 1/2015 Kojima ................... G06G 7/14
307/52
2016/0329713 A1* 11/2016 Berard ..................... H02J 3/24

FOREIGN PATENT DOCUMENTS

| JP | 2011-200084 | 10/2011 |
| JP | 2012-143018 | 7/2012 |
| WO | 2013/046656 | 4/2013 |
| WO | 2013/140916 | 9/2013 |

OTHER PUBLICATIONS

International Search Report, mailed May 13, 2014, in corresponding International Application No. PCT/JP2014/001463.

* cited by examiner

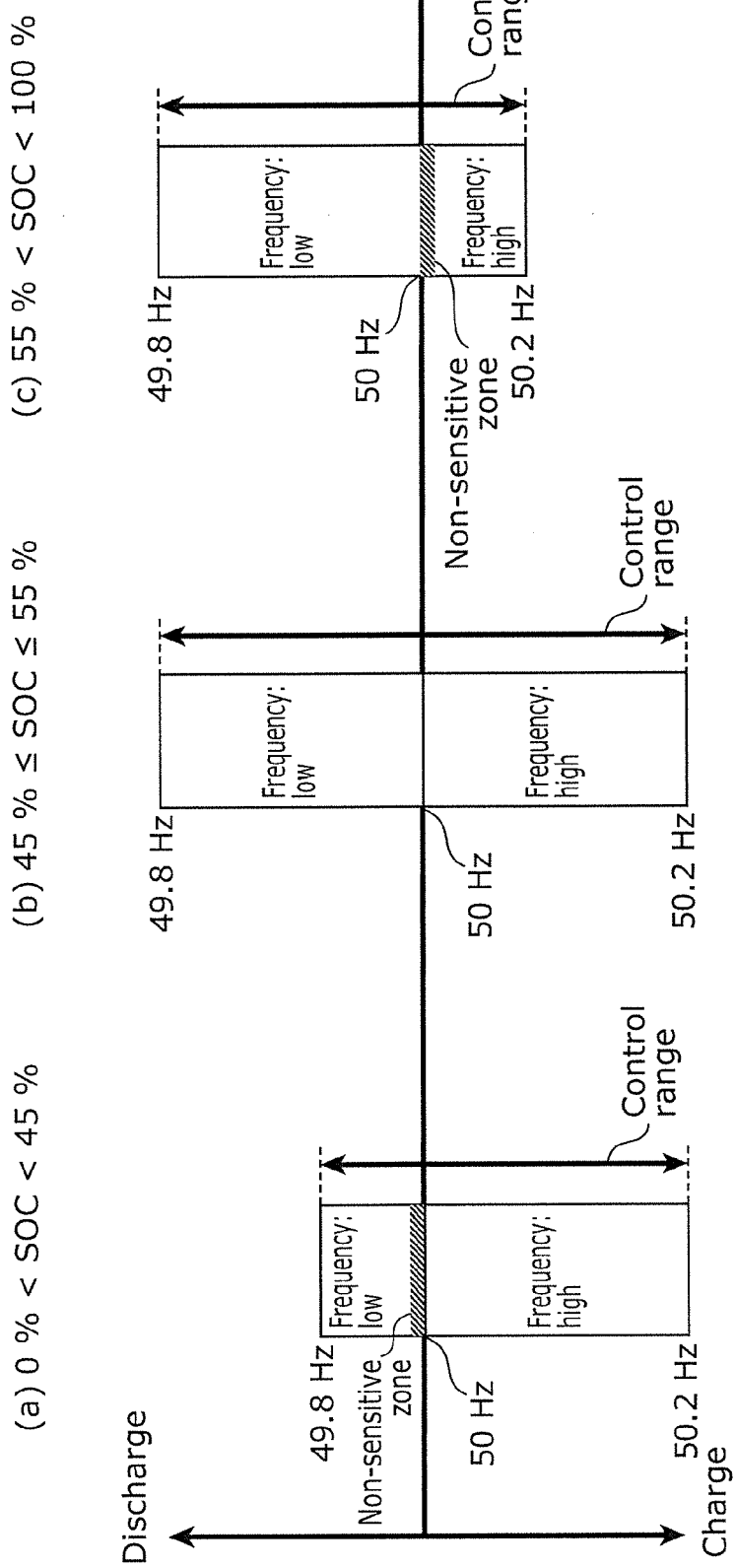

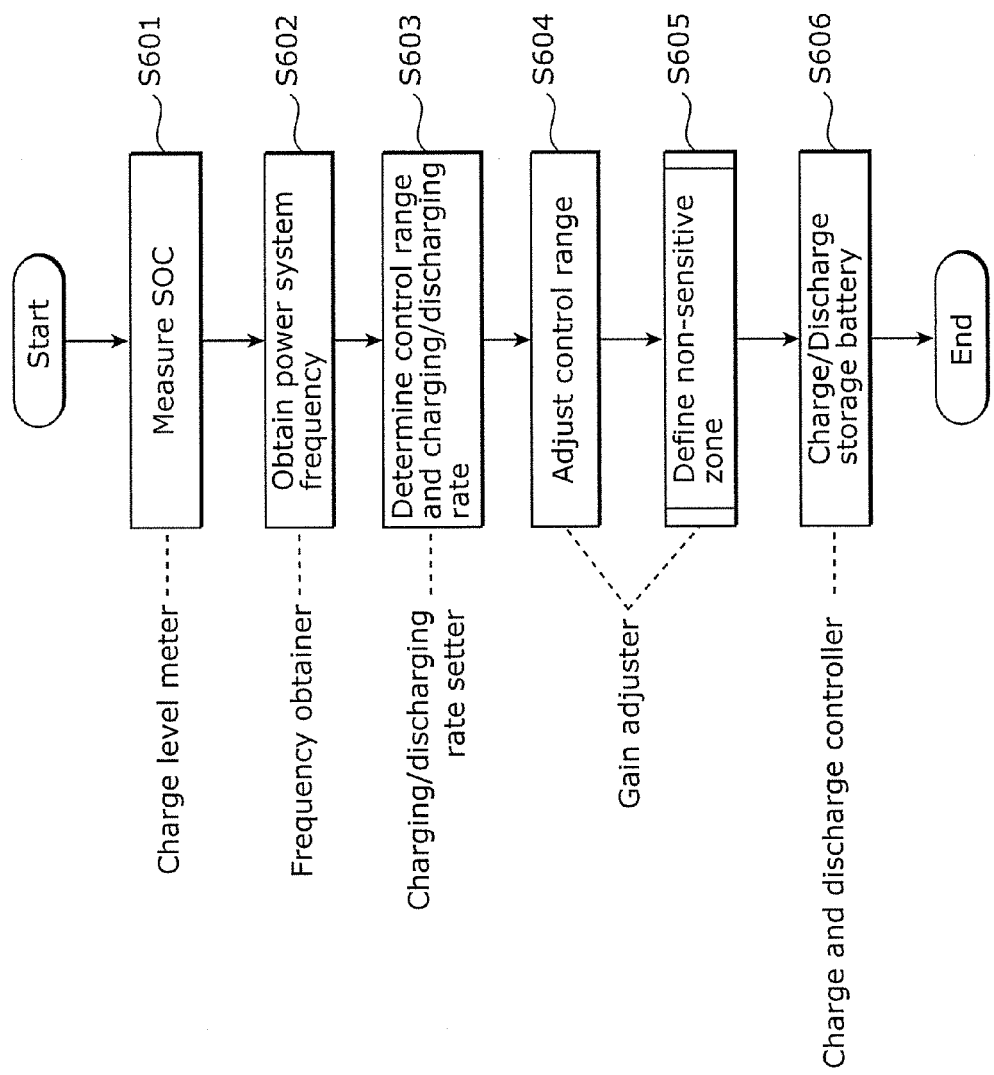

STORAGE BATTERY CONTROL DEVICE, STORAGE BATTERY CONTROL METHOD, AND STORAGE BATTERY CONTROL SYSTEM

TECHNICAL FIELD

The present invention relates to storage battery control devices, storage battery control methods, and storage battery control systems.

BACKGROUND

Conventionally, frequency regulation (FR) technique which regulates power system frequency by means of a storage battery has been known. In the FR technique, it is desired to charge and discharge the storage battery while keeping the charge level of the storage battery within a predetermined allowable range.

Patent Literature (PTL) 1 intends to keep the charge level of a storage battery within an allowable range, and discloses a control technique for keeping the charge level of the storage battery within an allowable range by correcting a control variable to be provided to the storage battery when the charge level of the storage battery has deviated from the allowable range.

CITATION LIST

Patent Literature

[PTL 1] Japanese Unexamined Patent Application Publication No. 2011-200084

SUMMARY OF INVENTION

Technical Problem

Unfortunately, according to the conventional technique, the charge level of the storage battery may become almost 100% or 0% when a charge command or a discharge command is continuously issued. This is why the storage battery cannot continuously provide frequency regulation.

In view of this, the present invention provides a storage battery control device that keeps the charge level of the storage battery within a normal range while performing proper frequency regulation.

Solution to Problem

A storage battery control device according to an aspect of the present invention is a storage battery control device for controlling charge and discharge of a storage battery to regulate power system frequency of an electric power system, the storage battery control device including: a frequency obtainer which obtains the power system frequency; a charge level meter which measures a charge level of the storage battery; a setter which sets a charging rate or a discharging rate according to the obtained power system frequency, the charging rate being a rate at which the storage battery is charged to approximate the power system frequency to rated frequency, the discharging rate being a rate at which the storage battery is discharged to approximate the power system frequency to the rated frequency; an adjuster which adjusts the charging rate or the discharging rate set by the setter, according to the obtained power system frequency and the measured charge level; and a charge and discharge controller which controls charge and discharge of the storage battery based on the adjusted charging rate or the adjusted discharging rate, in which the adjuster: when (i) the measured charge level is lower than a lower limit of a normal range and (ii) the obtained power system frequency is within a first non-sensitive zone ranging from a first frequency lower than the rated frequency to the rated frequency, adjusts the charging rate set by the setter to decrease the charging rate to a predetermined percentage of the charging rate; and when (i) the measured frequency is higher than an upper limit of the normal range and (ii) the obtained power system frequency is within a second non-sensitive zone ranging from a second frequency higher than the rated frequency to the rated frequency, adjusts the discharging rate set by the setter to decrease the discharging rate to a predetermined percentage of the discharging rate.

These general and specific aspects may be implemented using a system, a method, an integrated circuit, a computer program, a computer-readable recording medium such as a CD-ROM, or any combination of systems, methods, integrated circuits, computer programs, or computer-readable recording media.

Advantageous Effects of Invention

The storage battery control device according to the present invention can keep the charge level of the storage battery within an allowable range while performing proper frequency regulation.

BRIEF DESCRIPTION OF DRAWINGS

FIG. 5 is an illustration of charging and discharging rates in a charging and discharging controller according to Embodiment 1.

FIG. 6 is a flowchart of a setting and adjustment process of the charging or discharging rate in a storage battery control device according to Embodiment 1.

DESCRIPTION OF EMBODIMENTS

<Underlying Knowledge Forming Basis of the Present Invention>

The inventors have found that the storage battery control device described in the "Background art" has the following problems.

One of possible related arts of the storage battery control device for controlling charge and discharge of a storage battery sets a control range of charging and discharging rates and a base point serving as a criterion of the control range according to the charge level of the storage battery. Here, the base point means a charging or discharging rate of the storage battery when a frequency of an electric power system (hereinafter, also referred to as "power system frequency") is equal to a rated frequency.

Figure 10:
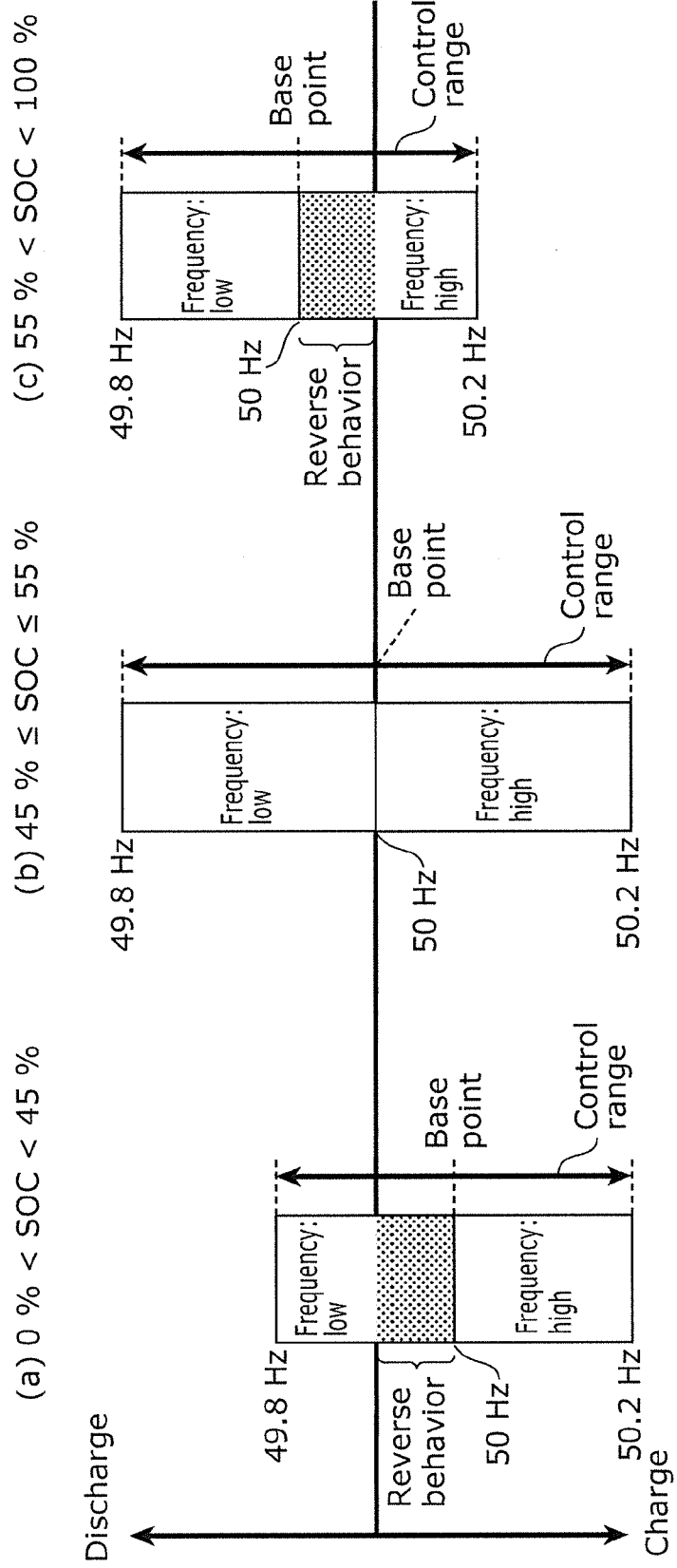
FIG. 10 is an illustration of the storage battery control method in a related art.

FIG. 10 is an illustration of the storage battery control method in a related art.

The cases (a), (b), and (c) in FIG. 10 each show the control range of the charging and discharging rates and the base point for varying frequency of the electric power system when: (a) the charge level is lower than the lower limit of a normal range; (b) the charge level is within the normal range; and (c) the charge level is higher than the upper limit of the normal range, respectively.

When the charge level is within the normal range, the storage battery control device in the related art sets the control range such that the control width is the same on the charge side and on the discharge side of the control range (the case (b) in FIG. 10). For example, when the power system frequency is shifted from the rated frequency to 50.2 Hz, the storage battery is charged at a charging rate corresponding to 50.2 Hz (for example, 20 kW). Alternatively, when the power system frequency is shifted from the rated frequency to 49.8 Hz, the storage battery is discharged at a discharging rate corresponding to 49.8 Hz (for example, 20 kW).

In the case (b) in FIG. 10, the base point is positioned at the center of the control range. In addition, the base point is the same as a point where both the charging rate and the discharging rate are zero. Accordingly, the storage battery is neither charged nor discharged when the power system frequency is equal to the rated frequency.

When the charge level is lower than the lower limit of the normal range, the storage battery control device in the related art adjusts the control range to make the upper limit of the control range smaller than that of the case (b) without changing the lower limit of the control range. Thus, the control range biased toward the charge side would make it possible to keep the charge level of the storage battery within the allowable range while performing proper frequency regulation.

A reverse behavior to be described below, however, may occur due to a shift in the base point toward the charge side caused by the above adjustment of the control range. In other words, when the power system frequency is shifted to a frequency slightly lower than 50 Hz (for example, 49.95 Hz), the storage battery should be discharged for the stabilization of the power system frequency, but the reverse behavior of charging the storage battery occurs. When the reverse behavior occurs, a difference between the power system frequency and the rated frequency becomes larger.

According to the storage battery control device in the related art, the same is true when the charge level is higher than the upper limit of the normal range (the case (c) in FIG. 10), and the reverse behavior occurs and the same problem arises.

In order to solve such problems, a storage battery control device according to an aspect of the present invention is a storage battery control device for controlling charge and discharge of a storage battery to regulate power system frequency of an electric power system, the storage battery control device including: a frequency obtainer which obtains the power system frequency; a charge level meter which measures a charge level of the storage battery; a setter which sets a charging rate or a discharging rate according to the obtained power system frequency, the charging rate being a rate at which the storage battery is charged to approximate the power system frequency to rated frequency, the discharging rate being a rate at which the storage battery is discharged to approximate the power system frequency to the rated frequency; an adjuster which adjusts the charging rate or the discharging rate set by the setter, according to the obtained power system frequency and the measured charge level; and a charge and discharge controller which controls charge and discharge of the storage battery based on the adjusted charging rate or the adjusted discharging rate, in which the adjuster: when (i) the measured charge level is lower than a lower limit of a normal range and (ii) the obtained power system frequency is within a first non-sensitive zone ranging from a first frequency lower than the rated frequency to the rated frequency, adjusts the charging rate set by the setter to decrease the charging rate to a predetermined percentage of the charging rate; and when (i) the measured frequency is higher than an upper limit of the normal range and (ii) the obtained power system frequency is within a second non-sensitive zone ranging from a second frequency higher than the rated frequency to the rated frequency, adjusts the discharging rate set by the setter to decrease the discharging rate to a predetermined percentage of the discharging rate.

With this, the storage battery control device controls the storage battery such that the charging or discharging rate of the storage battery is decreased when the charging or discharging rate deviates from the normal range and the difference between the power system frequency and the rated frequency is relatively small. This prevents the charge level of the storage battery from deviating further from the normal range, and makes it possible to contribute the stabilization of the power system frequency by means of the charge and discharge steps. Accordingly, the storage battery control device can keep the charge level within an allowable range while performing proper frequency regulation.

For example, the setter sets the charging rate or the discharging rate of the storage battery by defining a control function of the charging rate or the discharging rate with respect to the obtained power system frequency, the control function representing the charging rate or the discharging rate that changes linearly with respect to the power system frequency at a first rate of change, and the adjuster adjusts the charging rate or the discharging rate by changing a rate of change of the charging rate in the second non-sensitive zone of the control function or a rate of change of the discharging rate in the first non-sensitive zone of the control function to a second rate of change lower than the first rate of change.

With this, the storage battery control device can adjust the charging or discharging rate of the storage battery based on the control function of the charging or discharging rate with respect to the power system frequency. Here, a decrease in the charging or discharging rate of the storage battery when the difference between the power system frequency and the rated frequency is relatively small is reflected in the rate of change (slope) of the control function. Accordingly, the storage battery control device can keep the charge level within the allowable range while performing proper frequency regulation, in a quantitative manner.

For example, the adjuster adjusts the charging rate or the discharging rate to keep the rate of change of the charging rate or the rate of change of the discharging rate at the first rate of change at frequencies other than frequencies within the first non-sensitive zone and the second non-sensitive zone of the control function.

With this, when the difference between the power system frequency and the rated frequency is relatively large, the storage battery control device adjusts the charging rate using a rate of change equal to that of unadjusted charging rate, and the discharging rate using a rate of change equal to that of unadjusted discharging rate.

For example, the adjuster, when the obtained power system frequency is equal to the rated frequency, adjusts the charging rate or the discharging rate to prevent the storage battery from being charged and discharged.

With this, the storage battery control device causes the storage battery to be discharged without charging it when the power system frequency is lower than the rated frequency, and to be charged without discharging it when the power system frequency is higher than the rated frequency. This prevents the storage battery from operating against charge and discharge for the stabilization of the power system frequency (reverse behavior). Accordingly, the storage battery control device can keep the charge level within the allowable range while performing more proper frequency regulation.

For example, the adjuster: adjusts the discharging rate using, as the first frequency, a frequency higher than a frequency at which the discharging rate set by the setter is equal to a maximum allowable discharging rate of the storage battery; and adjusts the discharging rate using, as the second frequency, a frequency lower than a frequency at which the charging rate set by the setter is equal to a maximum allowable charging rate of the storage battery.

With this, a frequency range where the above adjustment of the rate of change is not performed is defined for frequencies below the non-sensitive zone when the power system frequency is lower than the rated frequency, and for frequencies above the non-sensitive zone when the power system frequency is higher than the rated frequency. Accordingly, the storage battery control device can keep the charge level within the allowable range while performing more proper frequency regulation.

For example, the setter further: (i) determines a maximum discharging rate which is a maximum allowable discharging rate of the storage battery; and (ii) when the discharging rate of the control function exceeds the maximum discharging rate, defines the control function in a manner that sets the discharging rate to the maximum discharging rate, and the adjuster further: when the measured charge level is lower than the lower limit of the normal range, determines an adjusted maximum discharging rate obtained by decreasing the maximum discharging rate according to the charge level; and when the discharging rate of the control function exceeds the adjusted maximum discharging rate, adjusts the discharging rate in a manner that sets the discharging rate to the determined adjusted maximum discharging rate.

With this, when the power system frequency is lower than the rated frequency, the storage battery control device can properly cause the storage battery to be charged or discharged at a rate lower than the adjusted maximum discharging rate determined according to the charge level. Accordingly, the storage battery can be properly charged or discharged according to a degree of the charge level.

For example, the adjuster calculates the adjusted maximum discharging rate according to (the maximum discharging rate)×(the charge level)/(the lower limit of the normal range).

With this, the storage battery control device can determine the adjusted maximum discharging rate according to the charge level in a quantitative manner.

For example, the maximum discharging rate is equal to a rated capacity of an inverter that converts DC power provided from the storage battery into AC power.

With this, the storage battery control device can take into account the rated capacity of the inverter to adjust the discharging rate.

For example, the setter further: (i) determines a maximum charging rate which is a maximum allowable charging rate of the storage battery; and (ii) when the charging rate of the control function exceeds the maximum charging rate, defines the control function in a manner that sets the charging rate to the maximum charging rate, and the adjuster further: when the measured charge level is higher than the upper limit of the normal range, determines an adjusted maximum charging rate obtained by decreasing the maximum charging rate according to the charge level; and when the charging rate of the control function exceeds the adjusted maximum charging rate, adjusts the charging rate in a manner that sets the charging rate to the determined adjusted maximum charging rate.

With this, when the power system frequency is higher than the rated frequency, the storage battery control device can properly cause the storage battery to be charged or discharged at a rate lower than the adjusted maximum charging rate determined according to the charge level. Accordingly, the storage battery can be properly charged or discharged according to a degree of the charge level.

For example, the adjuster calculates the adjusted maximum charging rate according to (the maximum charging rate)×{(a full charge level of the storage battery)−(the charge level)}/{(the full charge level of the storage battery)−(the upper limit of the normal range)}.

With this, the storage battery control device can determine the adjusted maximum charging rate according to the charge level in a quantitative manner.

For example, the maximum charging rate is equal to a rated capacity of an inverter that converts AC power provided from the electric power system into DC power.

With this, the storage battery control device can take into account the rated capacity of the inverter to adjust the charging rate.

For example, the second rate of change is greater than or equal to one-eighth of the first rate of change, and less than or equal to one-fourth of the first rate of change.

With this, the storage battery control device can set the rate of change of the charging or discharging rate with respect to the power system frequency in the non-sensitive zone to a value greater than or equal to one-eighth of a rate of change in a range other than the non-sensitive zone, and less than or equal to one-fourth of it.

For example, the adjuster determines the second rate of change based on a history of the obtained power system frequency and a history of the measured charge level.

With this, the storage battery control device determines the rate of change of the charging or discharging rate with respect to the power system frequency in the non-sensitive zone based on the histories of the power system frequency and the charge level. Accordingly, it is possible to reflect the results of control by the storage battery control device in the subsequent control of the power system frequency and the charge level.

For example, the normal range ranges from 45% to 55% of the full charge level of the storage battery.

With this, the storage battery control device can keep the charge level of the storage battery within the allowable range while performing frequency regulation so that the storage battery holds the charge level greater than or equal to 45% of the full charge level and less than or equal to 55% of it.

Furthermore, the storage battery control method according to an aspect of the present invention is a storage battery control method for controlling charge and discharge of a storage battery to regulate power system frequency of an electric power system, the method including: obtaining the power system frequency; measuring a charge level of the storage battery; setting a charging rate or a discharging rate according to the obtained power system frequency, the charging rate being a rate at which the storage battery is charged to approximate the power system frequency to rated frequency, the discharging rate being a rate at which the storage battery is discharged to approximate the power system frequency to the rated frequency; adjusting the charging rate or the discharging rate set in the setting, according to the obtained power system frequency and the measured charge level; and controlling charge and discharge of the storage battery based on the adjusted charging rate or the adjusted discharging rate, in which in the adjusting, when (i) the measured charge level is lower than a lower limit of a normal range and (ii) the obtained power system frequency is within a first non-sensitive zone ranging from a first frequency lower than the rated frequency to the rated frequency, the charging rate set in the setting is adjusted to decrease the charging rate to a predetermined percentage of the charging rate, and when (i) the measured charge level is higher than an upper limit of the normal range and (ii) the obtained power system frequency is within a second non-sensitive zone ranging from a second frequency higher than the rated frequency to the rated frequency, the discharging rate set in the setting is adjusted to decrease the discharging rate to a predetermined percentage of the discharging rate.

In this way, it is possible to obtain an effect similar to that of the above storage battery control device.

Furthermore, the storage battery control system according to an aspect of the present invention includes: a storage battery; and the above storage battery control device for controlling charge and discharge of the storage battery to regulate power system frequency of an electric power system.

With this, it is possible to obtain an effect similar to that of the above storage battery control device.

These general or specific aspects may be implemented using a system, a method, an integrated circuit, a computer program, or a computer-readable recording medium such as a CD-ROM, or any combination of systems, methods, integrated circuits, computer programs, or computer-readable recoding media.

Hereinafter, embodiments are described in greater detail with reference to the accompanying Drawings.

Each of the embodiments described below shows a general or specific example. The numerical value, shapes, materials, structural elements, the arrangement and connection of the structural elements, steps, the processing order of the steps etc. shown in the following embodiments are mere examples, and therefore do not limit the scope of the present invention. Therefore, among the structural elements in the following embodiments, structural elements not recited in any one of the independent claims are described as arbitrary structural elements.

Embodiment 1

Figure 1:
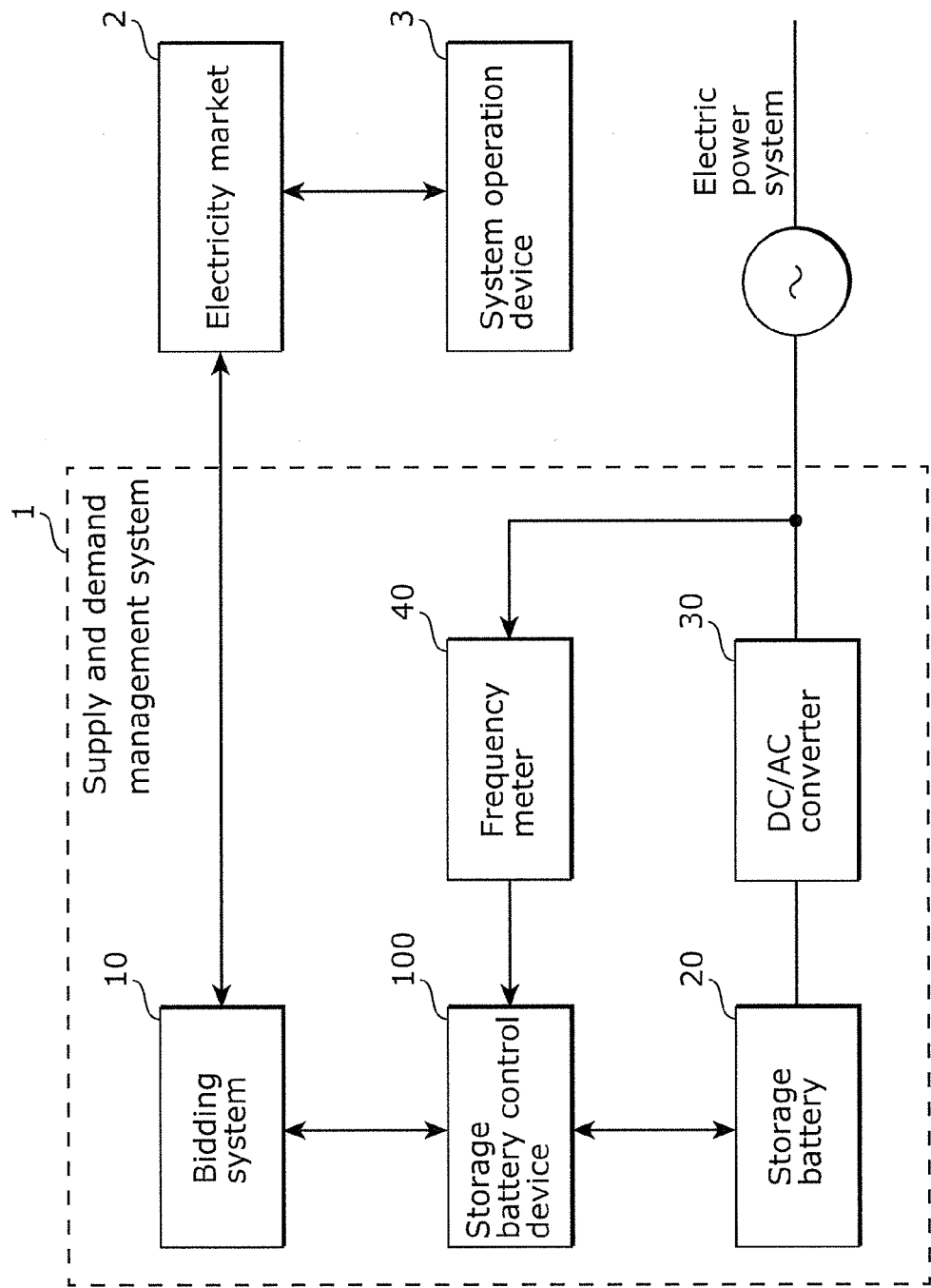
FIG. 1 is a block diagram showing a configuration of a supply and demand management system according to Embodiment 1.

FIG. 1 is a block diagram showing a configuration of a supply and demand management system according to Embodiment 1.

The supply and demand management system is a system for providing, as a service, balance controls between supply and demand. For example, one of the balance controls between supply and demand is frequency regulation in which power supply and demand is managed based on the frequency of AC power from an electric power system.

As shown in FIG. 1, the supply and demand management system 1 includes a bidding system 10, a storage battery control device 100, a storage battery 20, a DC/AC converter 30, and a frequency meter 40.

It is to be noted that in the supply and demand management system 1, the storage battery control device 100, the storage battery 20, the DC/AC converter 30, and the frequency meter 40 may be implemented as a single device or individual devices.

The bidding system 10 submits a bid to an electricity market 2 in response to operation by a service provider. For example, the bid includes: a service period during which a supply and demand management service is provided by means of the storage battery 20; control capacity which is maximum power available in the supply and demand management service; and bid price. The service period is a predetermined period of time during which the service provider desires to provide the supply and demand management service. In the following description, the service period is also referred to as a supply and demand management period.

The control capacity is a value indicating a power to be stored in and supplied from the storage battery 20. The control capacity is freely determined by the service provider not to exceed a maximum value of the power to be stored in and supplied from the storage battery 20. Although not shown in FIG. 1, bids are submitted from different service providers to the electricity market 2.

The bid price is set for "the length of service period x the control capacity", for example. The price for the service is proportional to an amount of power reserved for the supply and demand management service during the service period. It is to be noted that the bid price can be said to be a price for the supply and demand management service because the bid price is a price obtained by the service provider in exchange for providing the service.

A system operation device 3 selects and accepts a bid appropriate to the supply and demand management of the electric power system, from among the bids submitted from the bidding system 10 via the electricity market 2.

The storage battery 20 is controlled by the storage battery control device 100, and stores or supplies electric power.

The DC/AC converter 30 converts DC power provided from the storage battery 20 into AC power, and provides the AC power to the electric power system. The DC/AC converter 30 also converts AC power provided from the electric power system into DC power, and provide the DC power to the storage battery 20.

The frequency meter 40 measures power system frequency. Furthermore, the frequency meter 40 provides the measured power system frequency to the storage battery control device 100. The frequency meter 40 is implemented as a power sensor, for example.

The storage battery control device 100 performs charge and discharge control of the storage battery 20. In particular, the storage battery control device 100 perform the charge and discharge control of the storage battery 20 based on the power system frequency obtained by the frequency meter 40 and a charge level of the storage battery 20. When it is determined that the storage battery 20 needs to be discharged, the storage battery control device 100 causes the storage battery 20 to be discharged to provide power to the electric power system. Alternatively, when it is determined that the storage battery 20 needs to be charged, the storage battery control device 100 causes the storage battery 20 to be charged to obtain power from the electric power system.

It is to be noted that when the storage battery 20 is charged and discharged under control of the storage battery control device 100 for charging and discharging the storage battery 20, the supply and demand management system 1 may includes a DC/DC converter or the like as necessary.

Furthermore, the storage battery 20 and the storage battery control device 100 may be integrated into a single energy storage system. Alternatively, the storage battery 20, the storage battery control device 100, the frequency meter 40 and the DC/AC converter 30 may be integrated into a single energy storage system.

Figure 2:
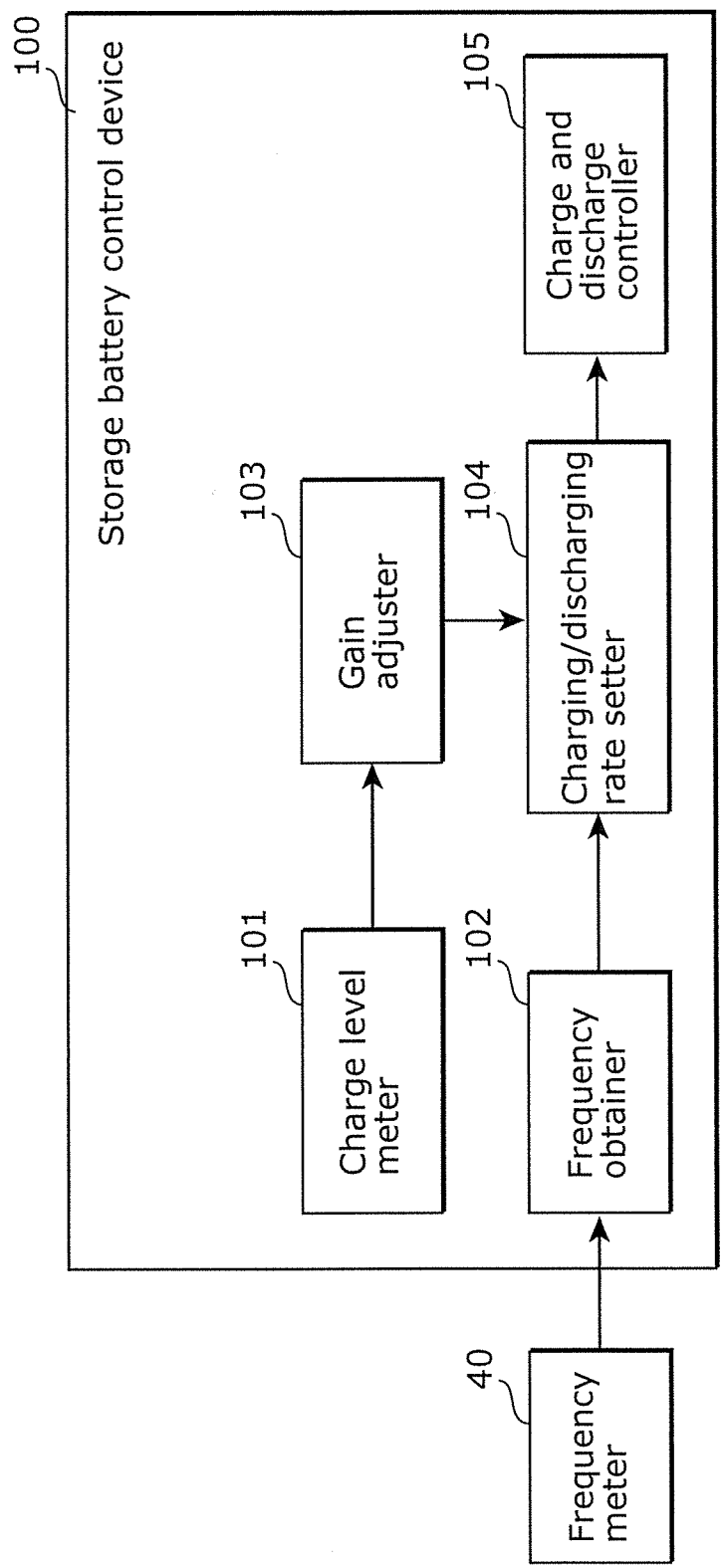
FIG. 2 is a functional block diagram of a storage battery control device according to Embodiment 1.

FIG. 2 is a functional block diagram of the storage battery control device according to Embodiment 1.

As shown in FIG. 2, the storage battery control device 100 includes a charge level meter 101, a frequency obtainer 102, a gain adjuster 103, a charging/discharging rate setter 104, and a charge and discharge controller 105.

The charge level meter 101 measures the charge level of the storage battery 20. The charge level, which represents power stored in the storage battery 20, increases when the storage battery 20 is charged, and decreases when the storage battery 20 is discharged. The charge level is also referred to as "State Of Charge (SOC)".

The frequency obtainer 102 obtains the power system frequency. In particular, the frequency obtainer 102 obtains, from the frequency meter 40, the power system frequency measured by the frequency meter 40. The AC power frequency of the electric power system is regulated to maintain the predetermined frequency (also referred to as rated frequency), but varies depending on the varying supply and demand balance between power supply from a power plant or the like and power demand from customers or the like. In continuous frequency regulation, the frequency meter 40 measures the power system frequency at regular intervals (for example, every one second or four seconds). It is to be noted that the rated frequency is 50 Hz or 60 Hz, for example. Hereinafter, the case of 50 Hz is described, but the same is true in other cases with any other values.

In particular, when the power demand is higher than the power supply, the power system frequency decreases to 49.9 Hz or 49.8 Hz, for example. In contrast, when the power supply is higher than the power demand, the power system frequency increases to 50.1 Hz or 50.2 Hz, for example.

The charging/discharging rate setter 104 sets a charging or discharging rate at which the storage battery 20 is charged or discharged to approximate the power system frequency to the rated frequency, according to the power system frequency obtained by the frequency obtainer 102. In this step, the charging/discharging rate setter 104 sets the charging or discharging rate of the storage battery 20 based on a predetermined relation between the power system frequency and the charging or discharging rate of the storage battery 20, for example. It is to be noted that the charging/discharging rate setter 104 corresponds to the setter.

In particular, when the power system frequency is lower than the rated frequency, the charging/discharging rate setter 104 controls the storage battery 20 such that the storage battery 20 is discharged. In this control, if the storage battery 20 is discharged more rapidly as the difference between the power system frequency and the rated frequency increases, the effect of keeping the power system frequency close to the rated frequency is enhanced.

On the other hand, when the power system frequency is higher than the rated frequency, the storage battery 20 is controlled such that the storage battery 20 is charged. In this control, if the storage battery 20 is charged more rapidly as the difference between the power system frequency and the rated frequency increases, the effect of keeping the power system frequency close to the rated frequency is enhanced.

The gain adjuster 103 adjusts the charging or discharging rate set by the charging/discharging rate setter 104, according to the power system frequency obtained by the frequency obtainer 102 and the charge level measured by the charge level meter 101.

In particular, when (i) the measured charge level is lower than a lower limit of a normal range and (ii) the obtained power system frequency is within a first non-sensitive zone ranging from a first frequency lower than the rated frequency to the rated frequency, the gain adjuster 103 adjusts the charging rate set by the charging/discharging rate setter 104 to decrease the charging rate to a predetermined percentage of the charging rate. Alternatively, when (i) the measured frequency is higher than an upper limit of the normal range and (ii) the obtained power system frequency is within a second non-sensitive zone ranging from a second frequency higher than the rated frequency to the rated frequency, the gain adjuster 103 adjusts the discharging rate set by the charging/discharging rate setter 104 to decrease the discharging rate to a predetermined percentage of the discharging rate.

It is to be noted that the predetermined percentage is greater than 0 and less than 1. Furthermore the gain adjuster 103 can use, as the first frequency, a frequency higher than a frequency at which the discharging rate set by the charging/discharging rate setter 104 is equal to a maximum allowable discharging rate of the storage battery 20. Furthermore, the gain adjuster 103 can use, as the second frequency, a frequency lower than a frequency at which the charging rate set by the charging/discharging rate setter 104 is equal to a maximum allowable charging rate of the storage battery 20.

In other words, the gain adjuster 103 adjusts the control range for charge and discharge of the storage battery 20 according to the charge level measured by the charge level meter 101.

Furthermore, the gain adjuster 103 also adjusts the relation between the power system frequency obtained by the frequency obtainer 102 and the charging or discharging rate of the storage battery 20 within the adjusted control range. In this adjustment, the gain adjuster 103 provides both the proper frequency regulation and the charge level kept within the allowable range by setting the non-sensitive zones (corresponding to the first and second non-sensitive zones as described above). The method of adjusting the control range and the method of adjusting the charging or discharging rate will be described below in detail. It is to be noted that the charging or discharging rate of the storage battery 20 is also referred to as a gain.

The charge and discharge controller 105 controls charge and discharge of the storage battery 20 based on the charging or discharging rate set by the charging/discharging rate setter 104 and further adjusted by the gain adjuster 103.

Figure 3:
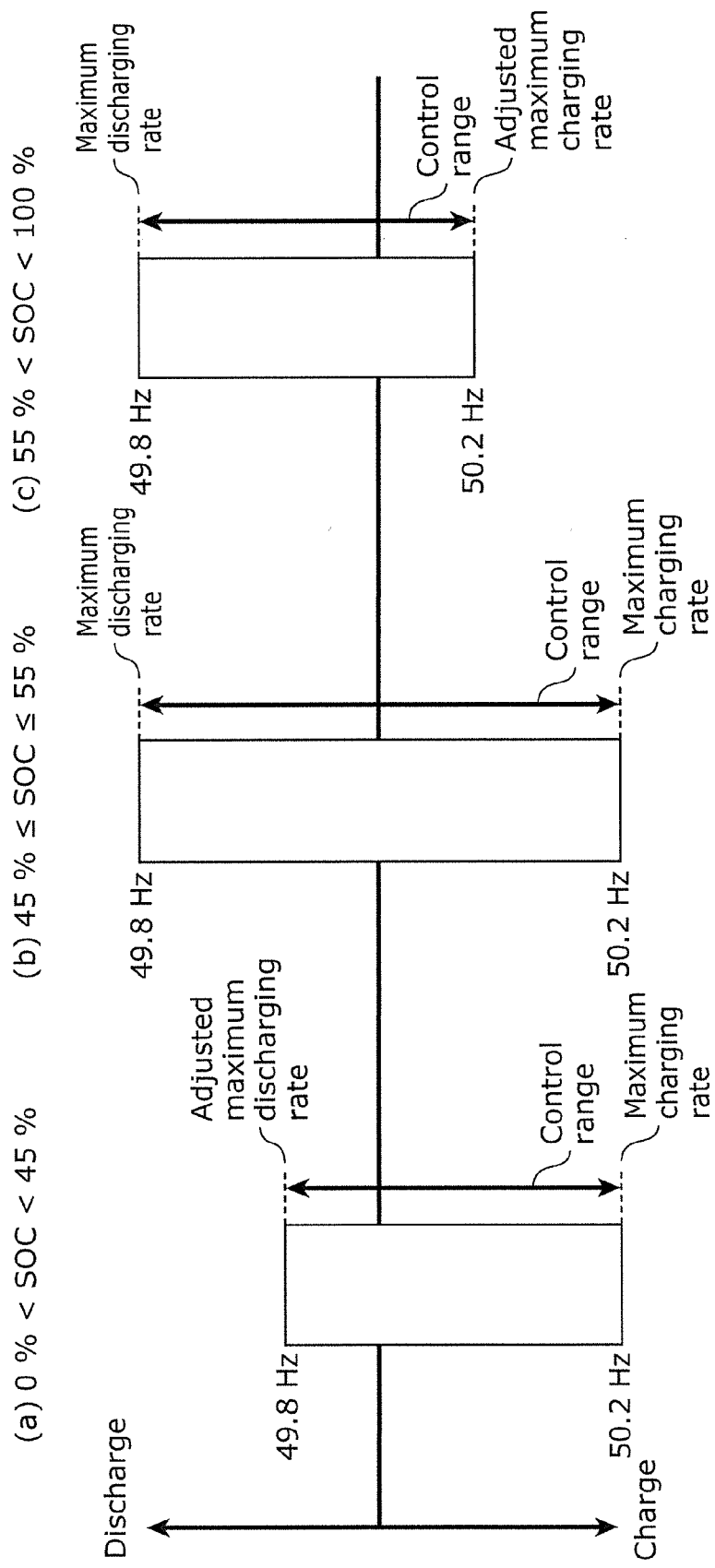
FIG. 3 is an illustration of control range setting and adjustment by a charging/discharging rate setter and a gain adjuster according to Embodiment 1.

FIG. 3 is an illustration of control range setting and adjustment by the charging/discharging rate setter and the gain adjuster according to Embodiment 1.

The cases (a), (b), and (c) in FIG. 3 each show the control range of the charging and discharging rates for varying power system frequency when: (a) the charge level is lower than the lower limit of the normal range; (b) the charge level is within the normal range; and (c) the charge level is higher than the upper limit of the normal range, respectively.

The charging/discharging rate setter 104 sets the control range such that the control width is the same on the charge side and on the discharge side of the control range (the case (b) in FIG. 3). For example, when the power system frequency is shifted from the rated frequency to 50.2 Hz, the storage battery 20 is charged at a charging rate corresponding to 50.2 Hz (for example, 20 kW). Alternatively, when the power system frequency is shifted from the rated frequency to 49.8 Hz, the storage battery 20 is discharged at a discharging rate corresponding to 49.8 Hz (for example, 20 kW). In this case, the control range of charge and discharge can be expressed as −20 kW to 20 kW. Here, the charging rate is expressed as a positive value and the discharging rate is expressed as a negative value. Hereinafter, the same expression is used.

The control width on the discharge side is also referred to as a maximum discharging rate, and the control width on the charge side is also referred to as a maximum charging rate. Furthermore, when the discharging rate of the control function exceeds the maximum discharging rate, the charging/discharging rate setter 104 defines the control function in a manner that sets the discharging rate to the maximum discharging rate. Furthermore, when the charging rate of the control function exceeds the maximum charging rate, the charging/discharging rate setter 104 defines the control function in a manner that sets the charging rate to the maximum charging rate.

It is to be noted that the maximum discharging rate may be set to a rated capacity of an inverter that converts DC power provided from the storage battery 20 into AC power. Furthermore, the maximum charging rate may be set to a rated capacity of an inverter that converts AC power provided from the electric power system into DC power.

The gain adjuster 103 adjusts the control range set by the charging/discharging rate setter 104, according to the charge level of the storage battery 20 in the following manner.

When the charge level is within the normal range, the gain adjuster 103 does not change the control range set by the charging/discharging rate setter 104. It is to be noted that the wording "the control range is adjusted" is also used for the case where the control range is not changed.

When the charge level is lower than the lower limit of the normal range, the gain adjuster 103 adjusts the control range to make the control width on the discharge side smaller than that of the case (b) (the case (a) in FIG. 3). In other words, when the measured charge level is lower than the lower limit of the normal range, the gain adjuster 103 determines an adjusted maximum discharging rate obtained by decreasing the maximum discharging rate according to the charge level, and when the discharging rate of the control function exceeds the adjusted maximum discharging rate, the gain adjuster 103 adjusts the discharging rate in a manner that sets the discharging rate to the determined adjusted maximum discharging rate.

For example, when the power system frequency is shifted from the rated frequency to 49.8 Hz, the storage battery 20 is discharged at a discharging rate lower than that of the case (b). The adjusted control width on the discharge side is also referred to as the adjusted maximum discharging rate. When the power system frequency is shifted to a frequency higher than the rated frequency, the charging rate is the same as that of the case (b).

More specifically, the gain adjuster 103 may calculate the adjusted maximum discharging rate according to Equation (Math.) 1.

$$\text{(adjusted maximum discharging rate)} = \text{(maximum discharging rate)} \times \text{(charge level)} / \text{(lower limit of normal range)} \quad \text{[Math. 1]}$$

When the charge level is higher than the upper limit of the normal range, the gain adjuster 103 adjusts the control range to make the control width on the charge side smaller than that of the case (b) (the case (c) in FIG. 3). In other words, when the measured charge level is higher than the upper limit of the normal range, the gain adjuster 103 determines an adjusted maximum charging rate obtained by decreasing the maximum charging rate according to the charge level, and when the charging rate of the control function exceeds the adjusted maximum charging rate, the gain adjuster 103 adjusts the charging rate in a manner that sets the charging rate to the determined adjusted maximum charging rate.

For example, when the power system frequency is shifted from the rated frequency to 50.2 Hz, the storage battery 20 is charged at a charging rate lower than that of the case (b). The adjusted control width on the charge side is also referred to as the adjusted maximum charging rate. When the power system frequency is shifted to a frequency lower than the rated frequency, the discharging rate is the same as that of the case (b).

More specifically, the gain adjuster 103 may calculate the adjusted maximum charging rate according to Equation (Math.) 2.

$$\text{(adjusted maximum charging rate)} = \text{(maximum charging rate)} \times \text{(full charge level} - \text{charge level)} / \text{(full charge level} - \text{upper limit of normal range)} \quad \text{[Math 2]}$$

In this way, the gain adjuster 103 adjusts the discharging rate to decrease it when the charge level of the storage battery 20 is below the normal range, and adjusts the discharging rate to increase it when the charge level of the storage battery 20 is above the normal range. This contributes the frequency regulation of the electric power system while keeping the charge level within or around the normal range.

It is to be noted that the normal range is a range defined to reduce deterioration of the storage battery 20. It is known that the deterioration is accelerated by charging or discharging the storage battery in a full charge state (or an almost full charge state) or in a no charge state (or an almost empty state). This is why the storage battery is desired to be placed in a state other than the above. Accordingly, the state other than the above is set as the normal range of the charge level. The normal range ranges from 45% to 55% of the full charge level, for example. It is to be noted that the upper limit and the lower limit of the normal range is not limited to the above values. For example, a range from 40% to 60% is possible. Furthermore, the upper limit and the lower limit of the normal range may be changed according to a type of the storage battery or the intended use.

Figure 4A:
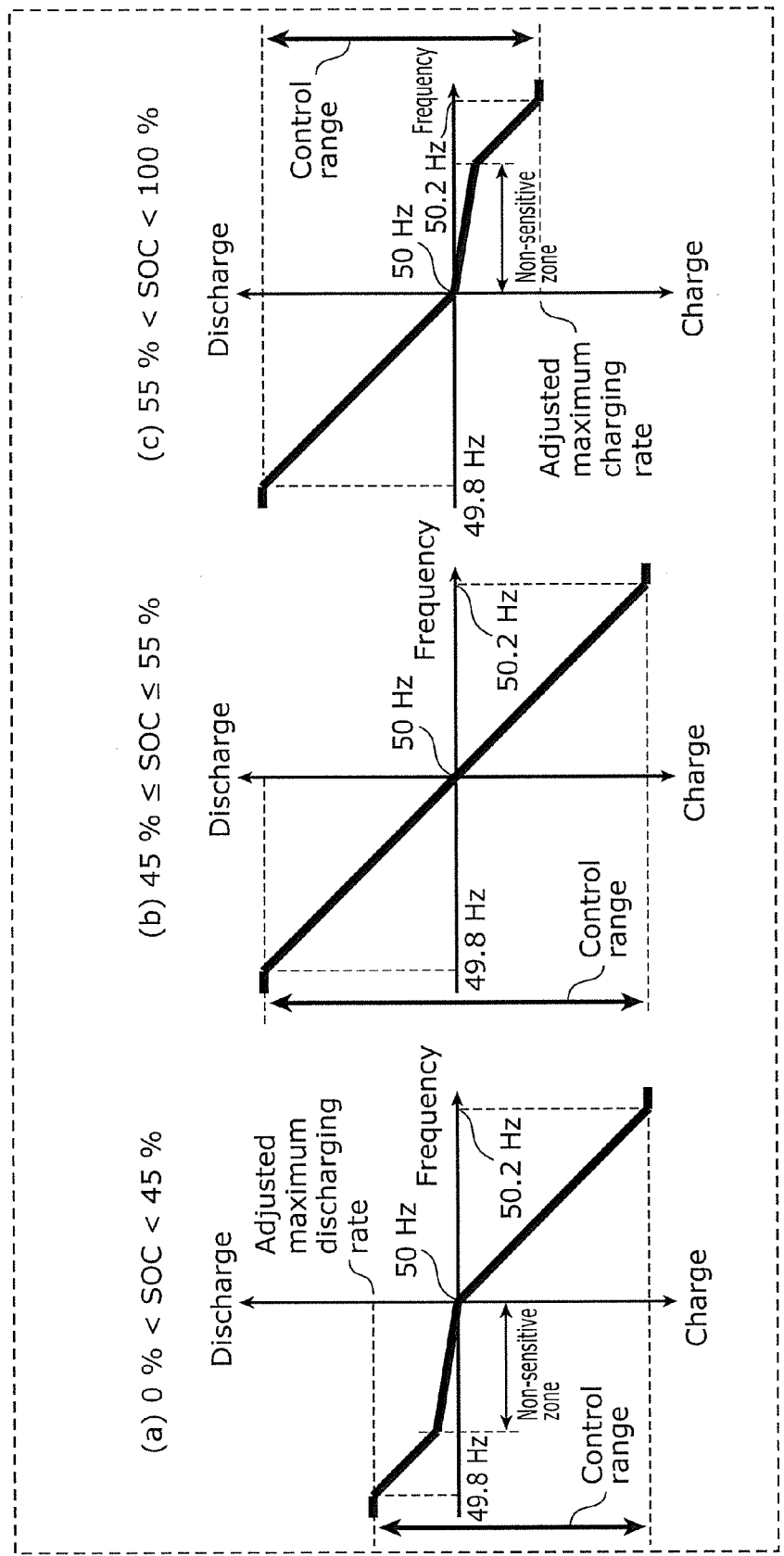
FIG. 4A is an illustration of setting of a charging or discharging rate and a non-sensitive zone by the charging/discharging rate setter and the gain adjuster according to Embodiment 1.

FIG. 4A is an illustration of setting of the charging or discharging rate and the non-sensitive zone by the charging/discharging rate setter and the gain adjuster according to Embodiment 1.

The cases (a), (b), and (c) in FIG. 4A each show a relation between the power system frequency and the charging or discharging rate of the storage battery 20 when: (a) the charge level is lower than the lower limit of the normal range; (b) the charge level is within the normal range; and (c) the charge level is higher than the upper limit of the normal range, respectively.

The charging/discharging rate setter 104 sets the charging or discharging rate with respect to the power system frequency as shown in FIG. 4A (b). In particular, the charging/discharging rate setter 104 defines a control function in which the charging or discharging rate changes linearly with respect to the power system frequency at a predetermined rate of change (the first rate of change). In the control function, when the charging or discharging rate exceeds the control width on the charge or discharge side, the maximum value is taken such that it is kept within the control width on the charge or discharge side. Furthermore, in the control function, when the power system frequency is equal to the rated frequency, the charging and discharging rates are set to zero so as not to cause the storage battery 20 to be charged and discharged. It is to be noted that the above rate of change is the slope of the function as shown in the case (b) in FIG. 4A or others.

The gain adjuster 103 adjusts the charging or discharging rate set by the charging/discharging rate setter 104, according to the charge level of the storage battery 20 in the following manner.

When the charge level is within the normal range, the gain adjuster 103 does not change the charging and discharging rates set by the charging/discharging rate setter 104.

When the charge level is lower than the lower limit of the normal range, as shown in the case (a) in FIG. 4A, the gain adjuster 103 adjusts the charging or discharging rate with respect to the power system frequency. In particular, the gain adjuster 103 defines a non-sensitive zone (the first non-sensitive zone) in a frequency region below the rated frequency, based on the control function shown in the case (b) in FIG. 4A. The gain adjuster 103 changes the rate of change of the discharging rate with respect to the power system frequency in the non-sensitive zone, to the second rate of change lower than that of the case (b). In other words, when the power system frequency is within the non-sensitive zone, compared with the otherwise case, the amount of change in the discharging rate of the storage battery 20 with respect to the power system frequency is reduced. Furthermore, the gain adjuster 103 keeps (does not change) the rate of change of the discharging rate with respect to the power system frequency at frequencies other than frequencies within the non-sensitive zone. A method of generating the control function with the non-sensitive zone will be described below in detail.

For example, the second rate of change is one-eighth of the first rate of change. Alternatively, the second rate of change may be greater than or equal to one-eighth of the first rate of change, and less than or equal to one-fourth of the first rate of change.

Alternatively, the second rate of change may be set to a value greater than −1 and less than zero. Furthermore, the second rate of change may be determined based on a history of the power system frequency and a history of the charge level. For example, the second rate of change is set to a certain value, and the storage battery control is performed by the storage battery control device 100 during a predetermined time. The second rate of change may be changed such that the history of change in the power system frequency during the predetermined time and the history of change in the charge level during the predetermined time become more desirable. In other words, the second rate of change may be changed such that the power system frequency during the predetermined time is kept close to the rated frequency as long as possible. Furthermore, the second rate of change may also be changed such that the charge level during the predetermined time is kept within the normal range as long as possible.

When the charge level is higher than the upper limit of the normal range, as shown in the case (c) in FIG. 4A, the gain adjuster 103 adjusts the charging or discharging rate with respect to the power system frequency. In particular, the gain adjuster 103 defines a non-sensitive zone (the second non-sensitive zone) in a frequency region above the rated frequency, based on the control function shown in the case (b) in FIG. 4A. In the non-sensitive zone, the rate of change of the discharging rate with respect to the power system frequency is changed to the second rate of change lower than that of the case (b). In other words, when the power system frequency is within the non-sensitive zone, compared with the otherwise case, the amount of change in the charging rate of the storage battery 20 with respect to the power system frequency is reduced. Furthermore, the gain adjuster 103 keeps (does not change) the rate of change of the charging rate with respect to the power system frequency at frequencies other than frequencies within the non-sensitive zone.

Figure 4B:
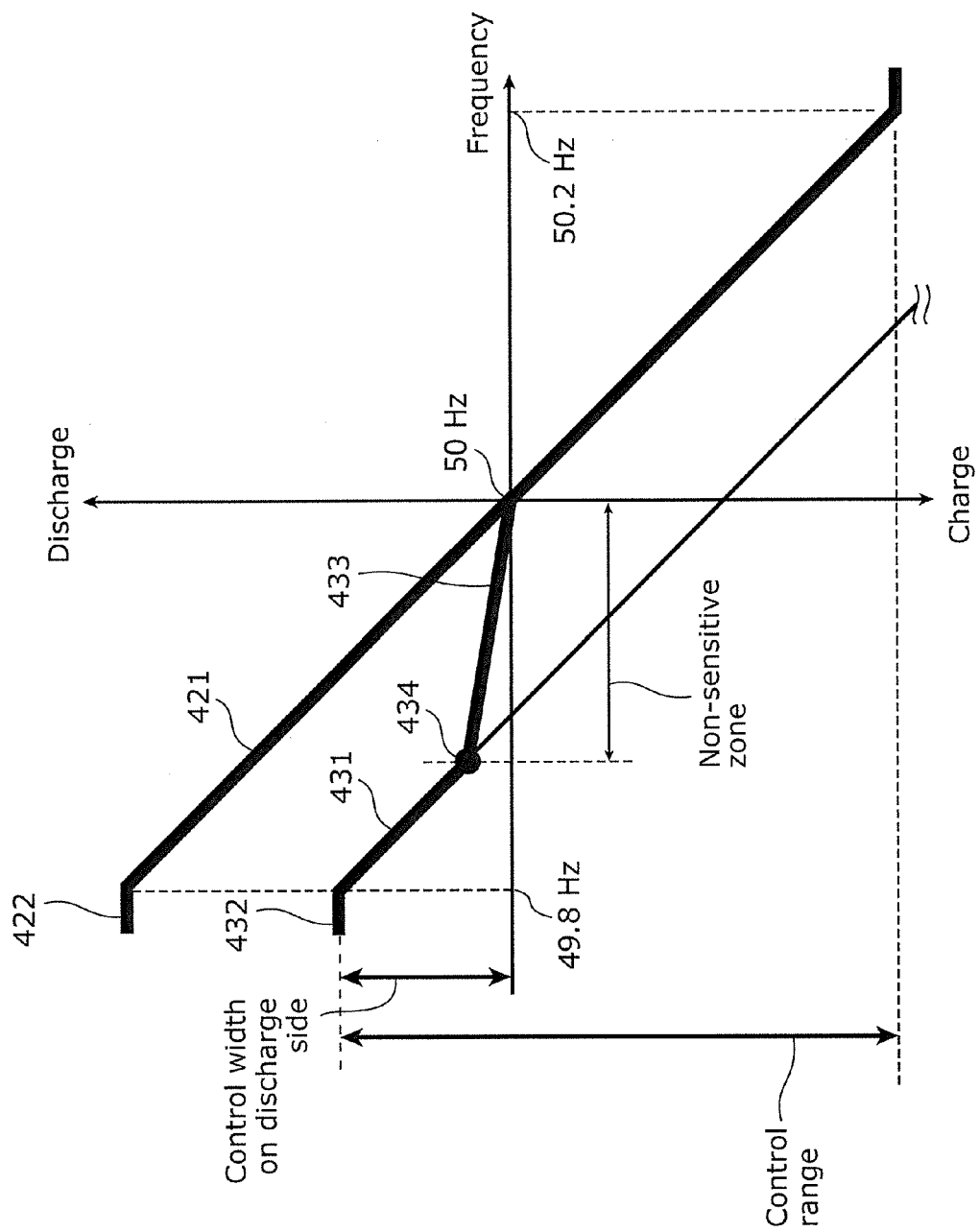
FIG. 4B is a detailed illustration of setting of the non-sensitive zone in the gain adjuster according to Embodiment 1.

FIG. 4B is a detailed illustration of setting of the non-sensitive zone in the gain adjuster according to Embodiment 1. In particular, FIG. 4B is an illustration of setting of the non-sensitive zone in the case where the charge level is lower than the lower limit of the normal range.

In FIG. 4B, a line 421 and a line 422 each represent a discharging rate set by the charging/discharging rate setter 104. When the charge level is lower than the lower limit of the normal range, the gain adjuster 103 adjusts the control range to decrease the control width on the discharge side as described above. In this step, the line 421 and the line 422 are shifted toward the charge side (downward in the paper) to obtain a line 431 and a line 432, respectively. Next, the gain adjuster 103 draws another line representing the discharging rate changed at the second rate of change, from a point representing the charging or discharging rate when the power system frequency is equal to the rated frequency (the origin) toward a lower frequency, and a segment 433, which is a part of the another line from the origin to an intersection 434 between the anther line and the line 431, is obtained. The gain adjuster 103 defines a frequency region corresponding to the segment 433 as the non-sensitive zone. Then, a line on the discharge side of the control function is replaced with the segment 433, a part of the line 431 corresponding to frequencies lower than that of the intersection 434, and the segment 432.

As described above, when the charge level is lower than the lower limit of the normal range, the gain adjuster 103 adjusts the control function to include the non-sensitive zone. It is to be noted that when the charge level is higher than the upper limit of the normal range, the operation illustrated by the graph shown in FIG. 4B is performed symmetrically about the origin, and thus the gain adjuster 103 adjusts the control function to include the non-sensitive zone in a similar manner to the above.

FIG. 5 is an illustration of the charging and discharging rates in the charge and discharge controller according to Embodiment 1.

The cases (a), (b), and (c) in FIG. 5 each show the control range of the charging and discharging rates for varying power system frequency and the non-sensitive zone when: (a) the charge level is lower than the lower limit of the normal range; (b) the charge level is within the normal range; and (c) the charge level is higher than the upper limit of the normal range, respectively. In the cases (a), (b), and (c) in FIG. 5, a relation in the control range between the power system frequency and the charging and discharging rates of the storage battery is added to the cases (a), (b), and (c) in FIG. 3, respectively.

In the case where the charge level is within the normal range (the case (b) in FIG. 5), the storage battery 20 is discharged when the power system frequency is lower than the rated frequency. Alternatively, the storage battery 20 is charged when the power system frequency is higher than the rated frequency. Alternatively, the storage battery 20 is neither discharged nor charged when the power system frequency is equal to the rated frequency.

In the case where the charge level is lower than the lower limit of the normal range (the case (a) in FIG. 5), the gain adjuster 103 adjusts the control range to make the control width on the discharge side smaller than that of the case where the charge level is within the normal range (the case (b) in FIG. 5). In this step, the gain adjuster 103 defines the non-sensitive zone in a region on the discharge side where the power system frequency is close to the rated frequency. It is to be noted that when the power system frequency is higher than or equal to the rated frequency, the charging rate in the case where the charge level is within the normal range (the case (b) in FIG. 5) is kept.

In the case where the charge level is higher than the upper limit of the normal range (the case (c) in FIG. 5), the gain adjuster 103 adjusts the control range to make the control width on the charge side smaller than that of the case where the charge level is within the normal range (the case (b) in FIG. 5). In this step, the gain adjuster 103 defines the non-sensitive zone in a region on the charge side where the power system frequency is close to the rated frequency. It is to be noted that when the power system frequency is lower than or equal to the rated frequency, the discharging rate in the case where the charge level is within the normal range (the case (b) in FIG. 5) is kept.

FIG. 6 is a flowchart of a setting and adjustment process of the charging or discharging rate in the storage battery control device according to Embodiment 1.

In step S601, the charge level meter 101 measures the charge level of the storage battery 20.

In step S602, the frequency obtainer 102 obtains the power system frequency from the frequency meter 40.

In step S603, the charging/discharging rate setter 104 sets the charging or discharging rate of the storage battery 20 and the control range. The method of setting the charging or discharging rate of the storage battery 20 and the control range through the charging/discharging rate setter 104 has been described above with reference to the case (b) in FIG. 3 and the case (b) in FIG. 4A.

In step S604, the gain adjuster 103 adjusts the control range of the storage battery 20 based on the charge level measured by the charge level meter 101 in step S601. The method of adjusting the control range of the storage battery 20 through the gain adjuster 103 has been described above with reference to the cases (a) and (c) in FIG. 3.

In step S605, the gain adjuster 103 defines the non-sensitive zone in the control range of the storage battery 20. The method of defining the non-sensitive zone through the gain adjuster 103 has been described above with reference to FIG. 4A and FIG. 4B.

In step S606, the charge and discharge controller 105 controls the charge and discharge of the storage battery 20.

Figure 7:
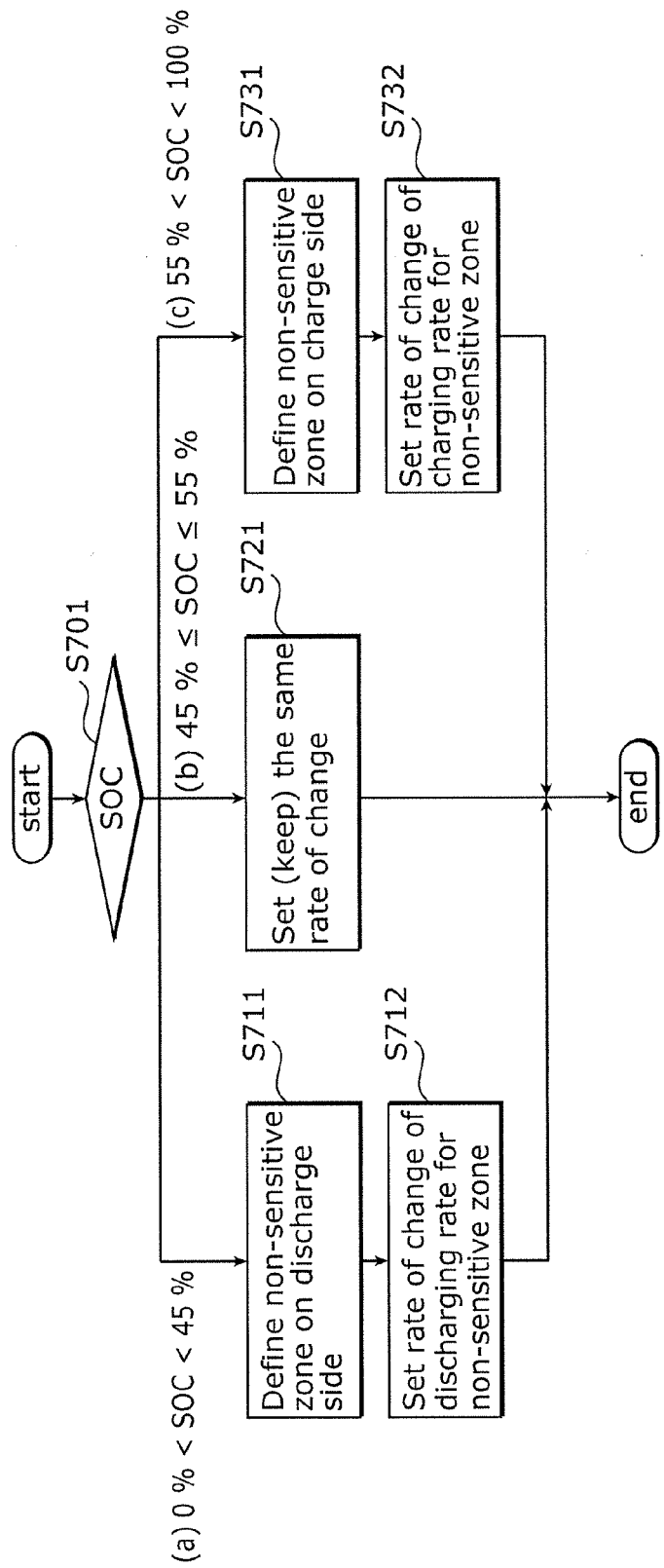
FIG. 7 is a flowchart of a gain adjustment process in the gain adjuster according to Embodiment 1.

FIG. 7 is a flowchart of a gain adjustment process in the gain adjuster according to Embodiment 1. In particular, FIG. 7 is a flowchart showing in detail the processing of step S603 in FIG. 6.

In step S701, the gain adjuster 103 determines whether the charge level measured by the charge level meter 101 in step S601 is: within the normal range; lower than the lower limit of the normal range; or higher than the upper limit of the normal range. Then, when the charge level is within the normal range, step S711 and the subsequent steps are performed. When the charge level is lower than the lower limit of the normal range, step S721 and the subsequent steps are performed. When the charge level is higher than the upper limit of the normal range, step S731 and the subsequent steps are performed.

In step S711, the gain adjuster 103 defines the non-sensitive zone on the discharge side of the control range of the storage battery 20.

In step S712, the gain adjuster 103 sets a rate of change of the discharging rate in the non-sensitive zone defined in step S711. Then, the processing in the case where the charge level is lower than the lower limit of the normal range is terminated.

In step S721, the gain adjuster 103 adjusts the charging or discharging rate to keep the same rate of change (the first rate of change). Then, the processing in the case where the charge level is within the normal range is terminated.

In step S731, the gain adjuster 103 defines the non-sensitive zone on the charge side of the control range of the storage battery 20.

In step S732, the gain adjuster 103 sets a rate of change of the charging rate in the non-sensitive zone defined in step S731. Then, the processing in the case where the charge level is higher than the upper limit of the normal range is terminated.

As described above, the storage battery control device according to Embodiment 1 controls the storage battery such that the charging or discharging rate of the storage battery is decreased when the charging or discharging rate deviates from the normal range and the difference between the power system frequency and the rated frequency is relatively small. This prevents the charge level of the storage battery from deviating further from the normal range, and makes it possible to contribute the stabilization of the power system frequency by means of the charge and discharge steps. Accordingly, the storage battery control device can keep the charge level within an allowable range while performing proper frequency regulation.

Embodiment 2

The following describes a storage battery control device according to Embodiment 2 which controls a charging or discharging rate of a storage battery based on power system frequency measured by a system operator, and others.

Figure 8:
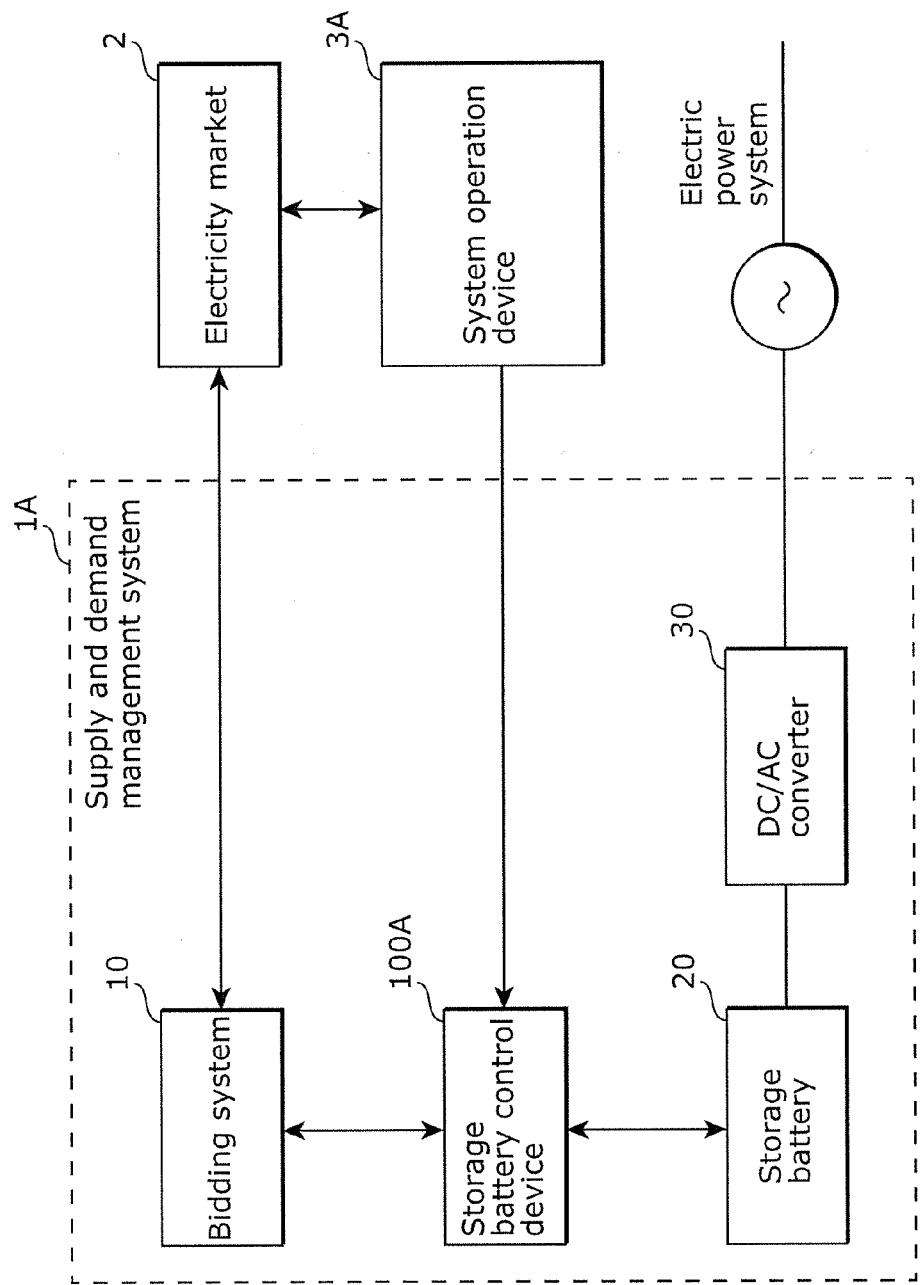
FIG. 8 is a block diagram of an overall configuration of a system including the storage battery control device according to Embodiment 2.

FIG. 8 is a block diagram of an overall configuration of a system including the storage battery control device according to Embodiment 2.

As shown in FIG. 8, a supply and demand management system 1A includes a bidding system 10, the storage battery control device 100A, a storage battery 20, and a DC/AC converter 30. The supply and demand management system 1A differs from the supply and demand management system 1 according to Embodiment 1 in that a frequency meter is not included.

A system operation device 3A selects and accepts a bid appropriate to the supply and demand management of an electric power system, from among the bids submitted from a bidding system 10 via an electricity market 2. The system operation device 3A includes the frequency meter and others. The detailed configuration of the system operation device 3A will be described separately.

The bidding system 10, the storage battery 20, and the DC/AC converter 30 are the same as those of Embodiment 1, and thus their descriptions are omitted.

The storage battery control device 100A performs charge and discharge control of the storage battery 20. In particular, the storage battery control device 100A perform the charge and discharge control of the storage battery 20 based on the charge level of the storage battery 20 and a relation between the power system frequency and the charging or discharging rate which is received from the system operation device 3A.

Figure 9:
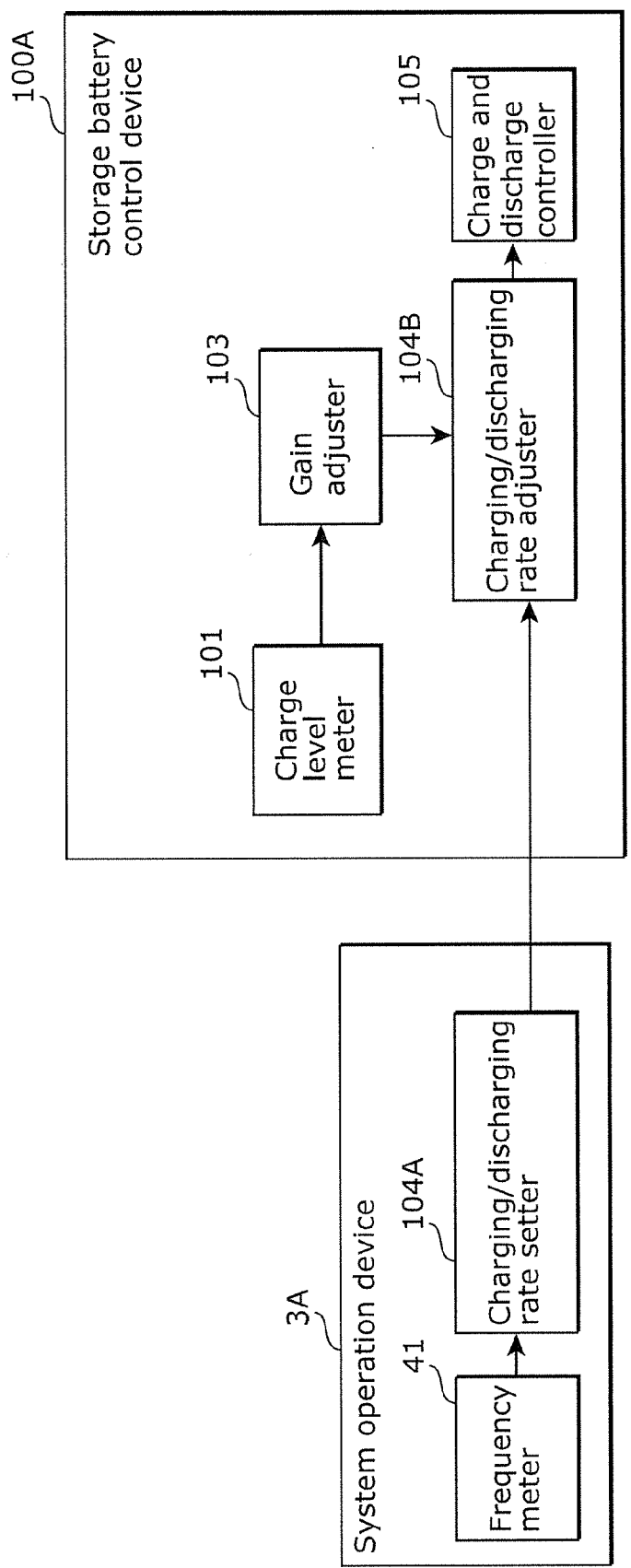
FIG. 9 is a functional block diagram of the storage battery control device according to Embodiment 2.

FIG. 9 is a functional block diagram of the storage battery control device according to Embodiment 2.

As shown in FIG. 9, the system operation device 3A includes the frequency meter 41 and a charging/discharging rate setter 104A. The storage battery control device 100A includes a charge level meter 101, a gain adjuster 103, a charging/discharging rate adjuster 104B, and a charge and discharge controller 105.

The frequency meter 41 measures the power system frequency, and provides the measured power system frequency to the charging/discharging rate setter 104A.

The charging/discharging rate setter 104A sets a charging or discharging rate at which the storage battery 20 is charged or discharged to approximate the power system frequency to the rated frequency, according to the power system frequency obtained by the frequency meter 41. The charging/discharging rate setter 104A sends the set charging or discharging rate to the storage battery control device 100A. In particular, the charging or discharging rate as shown in the case (b) in FIG. 3 and the case (b) in FIG. 4A according to Embodiment 1 is set.

The charging/discharging rate adjuster 104B adjusts the charging or discharging rate of the storage battery 20 based on a relation between the power system frequency and the charging or discharging rate which is received from the system operation device 3A (the charging/discharging rate setter 104A). In particular, as described above, the gain adjuster 103 receives the relation between the power system frequency and the charging or discharging rate, and performs the adjustment in the same manner as the case (a) or (c) in FIG. 3 and the case (a) or (c) in FIG. 4A according to Embodiment 1. The charging/discharging rate adjuster 104B adjusts the charging or discharging rate of the storage battery 20 based on the charging or discharging rate adjusted by the gain adjuster 103 in the foregoing manner.

The charge level meter 101, the gain adjuster 103, and the charge and discharge controller 105 are the same as those of Embodiment 1, and thus their descriptions are omitted.

With this configuration, even when the supply and demand management system 1A is not capable of measuring the power system frequency, it is possible to perform the charge and discharge control of the storage battery 20 based on information obtained from the system operation device 3A in the same manner as Embodiment 1.

Furthermore, with this configuration, it is possible to control one or more storage batteries 20 using the power system frequency measured by a system operator. A single system operation device is generally provided with one or more supply and demand management systems 1A. In this case, the single system operation device 3A measures the power system frequency, and can control the one or more storage batteries 20 using the measured power system frequency. Accordingly, there is an advantage that the same control can be performed at a lower cost than the case where the frequency meter is provided for each of the supply and demand management systems 1A.

It is to be noted that the storage battery control device may be implemented as a server. In this case, the storage battery control device includes a controller which controls the charge and discharge based on a control variable sent from the control device to the storage battery side.

Furthermore, as shown in Embodiment 1, the control device and the storage battery may be integrated in a single energy storage system to directly receive a FR control variable from the system operation device (without passing through a server or the like).

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the storage battery control device according to each of the embodiments is a program described below.

In other words, this program causes a computer to execute a storage battery control method for controlling charge and discharge of a storage battery to regulate power system frequency of an electric power system, the method including: obtaining the power system frequency; measuring a charge level of the storage battery; setting a charging rate or a discharging rate according to the obtained power system frequency, the charging rate being a rate at which the storage battery is charged to approximate the power system frequency to rated frequency, the discharging rate being a rate at which the storage battery is discharged to approximate the power system frequency to the rated frequency; adjusting the charging rate or the discharging rate set in the setting, according to the obtained power system frequency and the measured charge level; and controlling charge and discharge of the storage battery based on the adjusted charging rate or the adjusted discharging rate, in which in the adjusting, when (i) the measured charge level is lower than a lower limit of a normal range and (ii) the obtained power system frequency is within a first non-sensitive zone ranging from a first frequency lower than the rated frequency to the rated frequency, the charging rate set in the setting is adjusted to decrease the charging rate to a predetermined percentage of the charging rate, and when (i) the measured charge level is higher than an upper limit of the normal range and (ii) the obtained power system frequency is within a second non-sensitive zone ranging from a second frequency higher than the rated frequency to the rated frequency, the discharging rate set in the setting is adjusted to decrease the discharging rate to a predetermined percentage of the discharging rate.

Thus, the storage battery control device according to one or more aspects has been described based on the embodiments, but the present invention is not limited to these embodiments. Various modifications to the embodiments that can be conceived by those skilled in the art, and forms configured by combining structural elements in different embodiments without departing from the spirit of the present invention may be included in the scope of the one or more aspects.

INDUSTRIAL APPLICABILITY

The present invention is applicable to a storage battery control device that keeps the charge level of a storage battery within a normal range while performing proper frequency regulation.

REFERENCE SIGNS LIST 1, 1A Supply and demand management system
2 Electricity market
3, 3A System operation device
10 Bidding system
20 Storage battery
30 DC/AC converter
40, 41 Frequency meter
100, 100A Storage battery control device
101 Charge level meter
102 Frequency obtainer
103 Gain adjuster
104, 104A Charging/discharging rate setter
104B Charging/discharging rate adjuster
105 Charge and discharge controller

The invention claimed is:

1. A storage battery control device for controlling charge and discharge of a storage battery to regulate power system frequency of an electric power system, the storage battery control device comprising:
a frequency obtainer that obtains the power system frequency;
a charge level meter that measures a charge level of the storage battery;
a setter that sets a charging rate or a discharging rate according to the obtained power system frequency, the charging rate being a rate at which the storage battery is charged to approximate the power system frequency to rated frequency, the discharging rate being a rate at which the storage battery is discharged to approximate the power system frequency to the rated frequency;
an adjuster that adjusts the charging rate or the discharging rate set by the setter, according to the obtained power system frequency and the measured charge level; and
a charge and discharge controller that controls charge and discharge of the storage battery based on the adjusted charging rate or the adjusted discharging rate,
wherein the adjuster:
when (i) the measured charge level is lower than a lower limit of a normal range and (ii) the obtained power system frequency is within a first non-sensitive zone ranging from a first frequency lower than the rated frequency to the rated frequency, adjusts the charging rate set by the setter to decrease the charging rate to a predetermined percentage of the charging rate; and
when (i) the measured frequency is higher than an upper limit of the normal range and (ii) the obtained power system frequency is within a second non-sensitive zone ranging from a second frequency higher than the rated frequency to the rated frequency, adjusts the discharging rate set by the setter to decrease the discharging rate to a predetermined percentage of the discharging rate.

2. The storage battery control device according to claim 1, wherein
the setter sets the charging rate or the discharging rate of the storage battery by defining a control function of the charging rate or the discharging rate with respect to the obtained power system frequency, the control function representing the charging rate or the discharging rate that changes linearly with respect to the power system frequency at a first rate of change, and
the adjuster adjusts the charging rate or the discharging rate by changing a rate of change of the charging rate in the second non-sensitive zone of the control function or a rate of change of the discharging rate in the first non-sensitive zone of the control function to a second rate of change lower than the first rate of change.

3. The storage battery control device according to claim 2, wherein
the adjuster adjusts the charging rate or the discharging rate to keep the rate of change of the charging rate or the rate of change of the discharging rate at the first rate of change at frequencies other than frequencies within the first non-sensitive zone and the second non-sensitive zone of the control function.

4. The storage battery control device according to claim 1, wherein
the adjuster, when the obtained power system frequency is equal to the rated frequency, adjusts the charging rate or the discharging rate to prevent the storage battery from being charged and discharged.

5. The storage battery control device according to claim 1, wherein
the adjuster:
adjusts the discharging rate using, as the first frequency, a frequency higher than a frequency at which the discharging rate set by the setter is equal to a maximum allowable discharging rate of the storage battery; and
adjusts the discharging rate using, as the second frequency, a frequency lower than a frequency at which the charging rate set by the setter is equal to a maximum allowable charging rate of the storage battery.

6. The storage battery control device according to claim 2, wherein
the setter further: (i) determines a maximum discharging rate which is a maximum allowable discharging rate of the storage battery; and (ii) when the discharging rate of the control function exceeds the maximum discharging rate, defines the control function in a manner that sets the discharging rate to the maximum discharging rate, and
the adjuster further: when the measured charge level is lower than the lower limit of the normal range, determines an adjusted maximum discharging rate obtained by decreasing the maximum discharging rate according to the charge level; and when the discharging rate of the control function exceeds the adjusted maximum discharging rate, adjusts the discharging rate in a manner that sets the discharging rate to the determined adjusted maximum discharging rate.

7. The storage battery control device according to claim 6, wherein
the adjuster calculates the adjusted maximum discharging rate according to (the maximum discharging rate)×(the charge level)/
(the lower limit of the normal range).

8. The storage battery control device according to claim 6, wherein
the maximum discharging rate is equal to a rated capacity of an inverter that converts DC power provided from the storage battery into AC power.

9. The storage battery control device according to claim 2, wherein
the setter further: (i) determines a maximum charging rate which is a maximum allowable charging rate of the storage battery; and (ii) when the charging rate of the control function exceeds the maximum charging rate, defines the control function in a manner that sets the charging rate to the maximum charging rate, and
the adjuster further: when the measured charge level is higher than the upper limit of the normal range, determines an adjusted maximum charging rate obtained by decreasing the maximum charging rate according to the charge level; and when the charging rate of the control function exceeds the adjusted maximum charging rate, adjusts the charging rate in a manner that sets the charging rate to the determined adjusted maximum charging rate.

10. The storage battery control device according to claim 9, wherein
the adjuster calculates the adjusted maximum charging rate according to (the maximum charging rate)×{(a full charge level of the storage battery)−(the charge level)}/{(the full charge level of the storage battery)−(the upper limit of the normal range)}.

11. The storage battery control device according to claim 9, wherein
the maximum charging rate is equal to a rated capacity of an inverter that converts AC power provided from the electric power system into DC power.

12. The storage battery control device according to claim 2, wherein
the second rate of change is greater than or equal to one-eighth of the first rate of change, and less than or equal to one-fourth of the first rate of change.

13. The storage battery control device according to claim 12, wherein
the adjuster determines the second rate of change based on a history of the obtained power system frequency and a history of the measured charge level.

14. The storage battery control device according to claim 1, wherein
the normal range ranges from 45% to 55% of a full charge level of the storage battery.

15. A storage battery control method for controlling charge and discharge of a storage battery to regulate power system frequency of an electric power system, the method comprising:
obtaining the power system frequency;
measuring a charge level of the storage battery;
setting a charging rate or a discharging rate according to the obtained power system frequency, the charging rate being a rate at which the storage battery is charged to approximate the power system frequency to rated frequency, the discharging rate being a rate at which the storage battery is discharged to approximate the power system frequency to the rated frequency;
adjusting the charging rate or the discharging rate set in the setting, according to the obtained power system frequency and the measured charge level; and
controlling charge and discharge of the storage battery based on the adjusted charging rate or the adjusted discharging rate,
wherein in the adjusting,
when (i) the measured charge level is lower than a lower limit of a normal range and (ii) the obtained power system frequency is within a first non-sensitive zone ranging from a first frequency lower than the rated frequency to the rated frequency, the charging rate set in the setting is adjusted to decrease the charging rate to a predetermined percentage of the charging rate, and
when (i) the measured charge level is higher than an upper limit of the normal range and (ii) the obtained power system frequency is within a second non-sensitive zone ranging from a second frequency higher than the rated frequency to the rated frequency, the discharging rate set in the setting is adjusted to decrease the discharging rate to a predetermined percentage of the discharging rate.

16. A storage battery control system comprising:
a storage battery; and
the storage battery control device according to claim 1, for controlling charge and discharge of the storage battery to regulate power system frequency of an electric power system.

* * * * *